Figure 3:
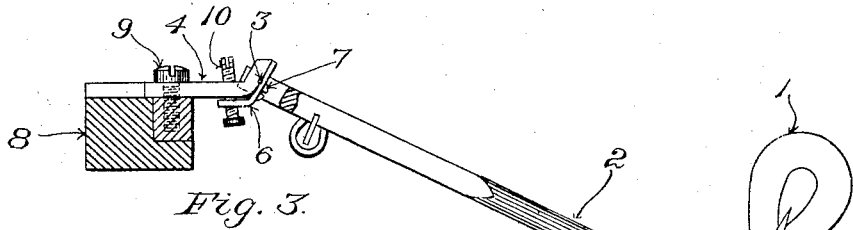

No. 851,646. PATENTED APR. 30, 1907.
R. S. BOWEN & F. H. WHITE.
PIANO ACTION.
APPLICATION FILED DEC. 28, 1904.

Witnesses:
Oscar F. Hill
Ida M. Hill

Inventors
Robert S. Bowen
Fred H. White
By Chas. F. Randall
Attorney.

UNITED STATES PATENT OFFICE.

ROBERT S. BOWEN, OF NEWTON CENTER, AND FRED H. WHITE, OF SOUTH EASTON, MASSACHUSETTS, ASSIGNORS TO CHICKERING & SONS, OF BOSTON, MASSACHUSETTS, A CORPORATION OF MASSACHUSETTS.

PIANO-ACTION.

No. 851,646.   Specification of Letters Patent.   Patented April 30, 1907.

Application filed December 28, 1904. Serial No. 238,587.

*To all whom it may concern:*

Be it known that we, ROBERT S. BOWEN and FRED H. WHITE, citizens of the United States, residing at Newton Center, in the county of Middlesex, State of Massachusetts, and at South Easton, in the county of Bristol, State of Massachusetts, have invented a certain new and useful Improvement in Piano-Actions, of which the following is a specification, reference being had therein to the accompanying drawings.

A leading object of the invention is to render practicable the use of a metal hammer-flange.

Another object thereof is to facilitate access to the securing screw of the cap-plate by which the pivot-pin of the hammer is held to its seat on the hammer-flange, for the purpose of tightening or loosening the said screw.

The use of metal hammer-flanges in pianos has been regarded as a desideratum, but the results attending such use have been unsatisfactory heretofore, owing in large part to tendency to accidental loss of adjustment of the screws which are employed as regulating screws for the repetition-levers. For one thing, unless such screws fit tightly within the holes that are tapped through the hammer-flanges they are liable to work out of adjustment in consequence of the vibration of the parts which takes place when the piano is played upon. It often happens that the regulating screws are not true in their cross-sectional shape. They sometimes are more or less elliptical in cross-section. When screws of imperfect shape in cross-section are inserted into cylindrical holes formed in the flanges for their reception they do not fit uniformly all round within such holes. An elliptical screw, for instance, bears tightly at opposite ends of its long diameter against the wall of the hole into which it is inserted, and slightly or not at all in the direction of its short diameter. The result of turning the defectively-shaped screw within a cylindrical hole in a metal flange is to enlarge such hole to correspond with the long diameter of the screw. It will be obvious that the frictional engagement of the thread of the imperfectly-shaped screw with the material of the wall of the hole into which it has been driven is less than would be the case if the screw were of perfect shape in cross-section. The degree of such engagement is decreased by the enlargement aforesaid of the hole resulting from rotating the screw within the hole. Hence, the screw, as a result of not being securely retained from rotating, is liable to turn in consequence of the vibrations that are produced in the playing of the piano, with resulting loss of adjustment.

In accordance with one feature of our invention, we provide means for locking the regulating screw from accidental or undesired turning movement. Preferably, in carrying the invention into effect we utilize a portion of the cap-plate for the purpose of thus locking the regulating-screw. In order to afford ready access to the securing screw for the cap-plate, we form the hammer-flange with the lug thereof inclined obliquely toward the strings, and apply the cap-plate and screw to the said lug in such manner that in the normal retracted position of the hammer the head of the said screw shall be exposed between the hammer-stem and the springs. In the case of the grand piano, the said lugs extend toward the upper side of the hammer-stem.

We have illustrated two embodiments of our invention in the accompanying drawings, in which latter,—

Figure 4:
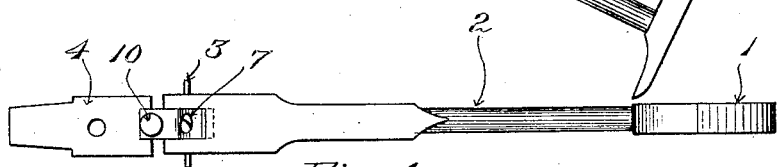
Figure 1:
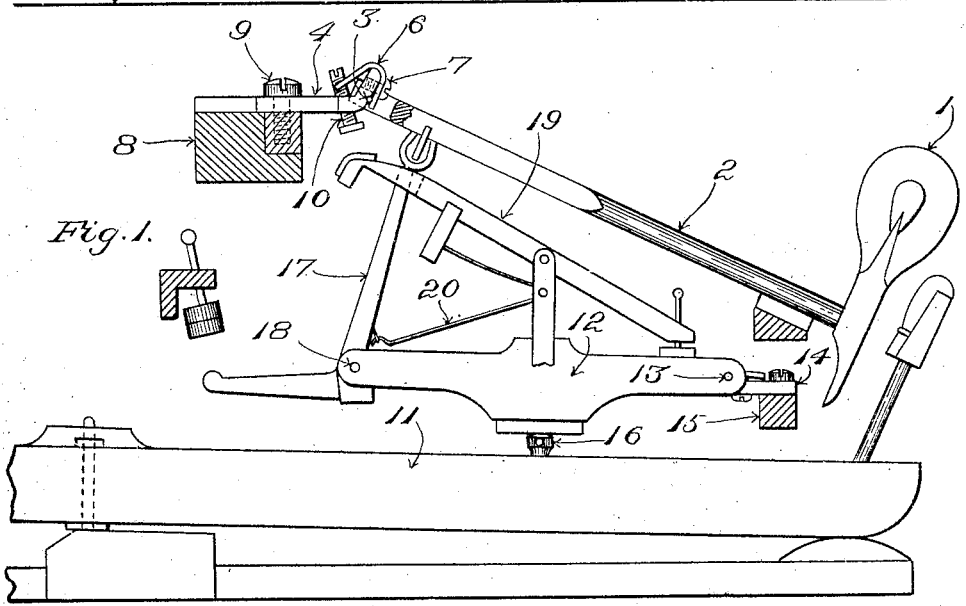
Figure 2:

Figure 1 shows portion of a piano-action having one of the said embodiments of the invention applied thereto, certain parts being in section on a vertical plane. Fig. 2 shows in plan a hammer and hammer-flange having applied thereto the embodiment of the invention which is also represented in Fig. 1. Fig. 3 shows in side elevation a hammer and hammer-flange having a second embodiment of our invention applied thereto. Fig. 4 is a bottom-view of the flange and cap-plate of Fig. 3.

It is to be understood that the action itself is not of the gist of the invention, and that the invention is not restricted in application to the precise action here shown.

In the drawings,—having reference more particularly to Fig. 1, the position of the strings is indicated at A. A hammer is represented at 1, the hammer stem being designated 2. The pivotal-pin of the hammer is indicated at 3, a flange to which the said pivotal-pin is fitted substantially as heretofore being shown at 4, the cap-plate by which the said pivotal-pin is held to its bearing on the said flange being marked 6, and the securing-screw for the said cap-plate being represented at 7. The stem of the screw 7 passes through a hole in the cap-plate and enters a threaded hole that is tapped in the flange 4. The hammer-flange rail, upon which the hammer-flange is mounted, is shown at 8, the screw by which the hammer-flange is secured in place being designated 9. A repetition-lever regulating-screw is shown at 10, its screw-threaded stem occupying a threaded hole that is tapped through the hammer-flange. Hammer-operating devices of well-known character are shown, comprising the key 11, of which only a portion is shown, the jack-bed 12, pivoted at 13 to the jack-flange 14 attached to the jack-rail 15, and resting upon the head of the capstan-screw 16 carried by the key, the fly or jack 17 pivoted at 18 upon the jack-bed, the repetition-lever 19 mounted upon the jack-bed, the spring 20 in connection with the fly or jack and repetition-lever, etc.

In conformity with one portion of our invention we provide, in connection with the regulating-screw 10 for the repetition-lever, means to resist the tendency of the said screw to rotate. The said means consists of a locking-device engaging with the said screw. Thereby the regulating-screw is prevented from turning accidentally, as in consequence of vibrations. The screw may be effectively locked by the pressure of a movable piece against the threaded stem thereof. We usually lock it in this manner, and preferably utilize for the purpose the cap-plate, a portion thereof being caused to engage with the said threaded stem. In the construction which is represented in Figs. 1 and 2, the tail-end of the cap-plate makes contact with the exterior of the threaded stem of the regulating-screw, the said tail-end preferably being notched to receive a portion of the body of the said stem and to fit the said portion. On turning the securing-screw 7 to tighten the cap-plate against the pivotal pin 3, the tail-end of the cap-plate is pressed against the said stem. In the case of the construction which is represented in Figs. 3 and 4 of the drawings, a hole is formed through the tail-end of the cap-plate, the stem of the regulating-screw being caused to pass through this hole. When the securing-screw 7 is turned to tighten the cap-plate against the pivotal pin the wall of this hole is caused to bear against the threaded portion of the stem of the regulating-screw. Contact of one side of the said wall with the stem of the regulating-screw may be relied upon to effect the practical locking of the regulating-screw. Preferably, however, we utilize the contact of the said wall with opposite sides of the said stem, the action of the securing-screw 7 in being turned to tighten the cap-plate against the pivotal-pin of the hammer being to cant or tip the cap-plate relative to the axis of the stem of the regulating-screw so as to cramp the said relating-screw. Usually, also, in order to secure the most effectual hold upon the stem of the regulating-screw, we tap the hole through the cap-plate with a thread corresponding and engaging with that of the regulating-screw.

In conformity with the second portion of our invention, in order to afford ready access to the head of the securing-screw 7 for the cap-plate 6, we bend toward the position of the strings, which in Fig. 1 of the drawings is upward, the lug, at the free extremity of the hammer-flange, to which the butt-end of the hammer-stem is pivoted. The securing-screw 7 enters the inclined or obliquely disposed lug after passing through its hole in the portion of the cap-plate which lies against the outer surface of the said lug. With this construction, when the hammer is in its retracted position, as shown for example by Fig. 1, the head of the securing-screw 7 is exposed above the butt of the hammer-stem in position rendering it readily accessible with a screw-driver while the hammer occupies its normal retracted position.

In Figs. 1 and 2 the cap-plate is formed of substantially U-shape to fit over the end of the lug of the hammer-flange, and is shown in the said figures fitted to the said lug with one leg thereof in front of the latter and the other at the rear thereof, the securing-screw 7 being located above the pivotal pin and its bearing. In Figs. 3 and 4 the cap-plate is of angular shape and is fitted to the exterior of the angle or bend of the hammer-flange, one portion thereof passing beneath the under side of the hammer-flange and the other extending upwardly adjacent the outer surface of the lug of the hammer-flange. In this instance the securing-screw 7 is located below the pivotal pin and its bearing between the said pivotal-pin and the regulating-screw. In both instances the bearing for the pivotal-pin is located between the securing-screw 7 and a free end of the cap-plate, and free opportunity is afforded for the insertion of the pivotal-pin into its bearing, or the removal of the same therefrom, past the said end of the cap-plate.

We claim as our invention:—

1. The combination with the hammer, its supporting-flange, the repetition-lever, and the regulating-screw for the said lever, of the cap-plate retaining the hammer in its pivotal connection with said supporting-flange and in addition engaging with the threaded stem of the said screw to lock the latter against accidental turning.

2. The combination with the hammer the strings and the regulating-screw, of the hammer-flange having its extremity inclined toward the plane of the strings, the cap-plate applied to the said extremity, and the securing-screw engaging with the cap-plate between the pivotal pin of the hammer and the regulating-screw.

3. The combination with the strings and the hammer, of the hammer-flange having its extremity inclined toward the plane of the strings, the cap-plate applied to the said extremity and retaining the hammer in pivotal connection with its bearing on the said inclined extremity of the hammer-flange, and the securing-screw engaging with the said cap-plate, the said bearing being located between the securing-screw and the free end of the cap-plate, the inclination of the flange rendering the head of the securing-screw accessible between the hammer-stem and the strings in the retracted position of the hammer.

4. The combination with the hammer, the hammer-flange, the repetition-lever, and the regulating-screw for the said lever, of the cap-plate retaining the hammer in pivotal connection with the hammer-flange and in addition engaging with the said screw to hold the latter from accidental turning, and the securing-screw for said cap-plate operating to press the latter against the said regulating screw.

In testimony whereof we affix our signatures, in presence of two witnesses.

ROBERT S. BOWEN.
FRED H. WHITE.

Witnesses:
   CHAS. F. RANDALL,
   EDITH J. ANDERSON.